United States Patent
Takaishi et al.

(10) Patent No.: US 10,247,349 B2
(45) Date of Patent: Apr. 2, 2019

(54) PREVENTING PROGRESSION OF CORROSION IN STEEL PIPE STRUCTURE

(71) Applicant: NITTO CHEMICAL CO., LTD., Tokyo (JP)

(72) Inventors: Kazuhiro Takaishi, Tokyo (JP); Takehiro Miyazawa, Tokyo (JP); Yoshio Tamura, Tokyo (JP); Takuhiko Ohashi, Tokyo (JP); Masashi Suematsu, Tokyo (JP); Osamu Hatsumi, Tokyo (JP); Tadashi Kimura, Tokyo (JP); Makoto Ide, Tokyo (JP); Isao Naganuma, Saitama (JP); Marco Volpato, Milan (IT); Maurizio Corti, Milan (IT); Tetsuya Matayoshi, Chiba (JP); Kouei Miyazato, Chiba (JP); Shinichi Suzuki, Tokyo (JP); Nobuo Okamura, Tokyo (JP); Kozo Hatsumi, Tokyo (JP); Hiromi Hasegawa, Kanagawa (JP)

(73) Assignee: Nitto Chemical Co., Ltd., Tokyo (JP)

(*) Notice: Subject to any disclaimer, the term of this patent is extended or adjusted under 35 U.S.C. 154(b) by 344 days.

(21) Appl. No.: 15/207,193

(22) Filed: Jul. 11, 2016

(65) Prior Publication Data

US 2016/0319981 A1   Nov. 3, 2016

Related U.S. Application Data

(63) Continuation of application No. PCT/JP2015/050007, filed on Jan. 5, 2015.

(30) Foreign Application Priority Data

Jan. 14, 2014 (JP) .................. 2014-004287

(51) Int. Cl.
*B29C 44/12* (2006.01)
*B29C 44/14* (2006.01)
(Continued)

(52) U.S. Cl.
CPC ........ *F16L 58/1009* (2013.01); *B29C 44/128* (2013.01); *B29C 44/14* (2013.01);
(Continued)

(58) Field of Classification Search
CPC ............. F16L 58/1009; B29K 2075/00; B29K 2105/04; B29K 2705/12
See application file for complete search history.

(56) References Cited

U.S. PATENT DOCUMENTS

2013/0026670 A1* 1/2013 Birch .................. B29C 44/1214
264/41

FOREIGN PATENT DOCUMENTS

JP      61-36438      2/1986
JP      2845641       1/1999
(Continued)

*Primary Examiner* — Kelly M Gambetta
(74) *Attorney, Agent, or Firm* — Silicon Valley Patent Group LLP

(57) ABSTRACT

In a configuration of a method for preventing progression of corrosion in a steel pipe structure according to the present invention, two or more types of liquids 150 are injected, while being mixed, into a steel pipe that constitutes the steel pipe structure, from an opening at one of both ends of the steel pipe, and the inside of the steel pipe is filled with resin foam product (foam product 152) by foam expansion and hardening of the two or more types of liquids.

7 Claims, 6 Drawing Sheets

(51) Int. Cl.
*F16L 58/10* (2006.01)
*E04H 12/10* (2006.01)
*B29K 75/00* (2006.01)
*B29K 105/04* (2006.01)
*B29K 705/12* (2006.01)
*B29L 23/00* (2006.01)

(52) U.S. Cl.
CPC .......... *E04H 12/10* (2013.01); *B29K 2075/00* (2013.01); *B29K 2105/04* (2013.01); *B29K 2705/12* (2013.01); *B29L 2023/22* (2013.01)

(56) References Cited

FOREIGN PATENT DOCUMENTS

| | | |
|---|---|---|
| JP | 2004-107708 | 4/2004 |
| JP | 2012-144772 | 8/2012 |

\* cited by examiner

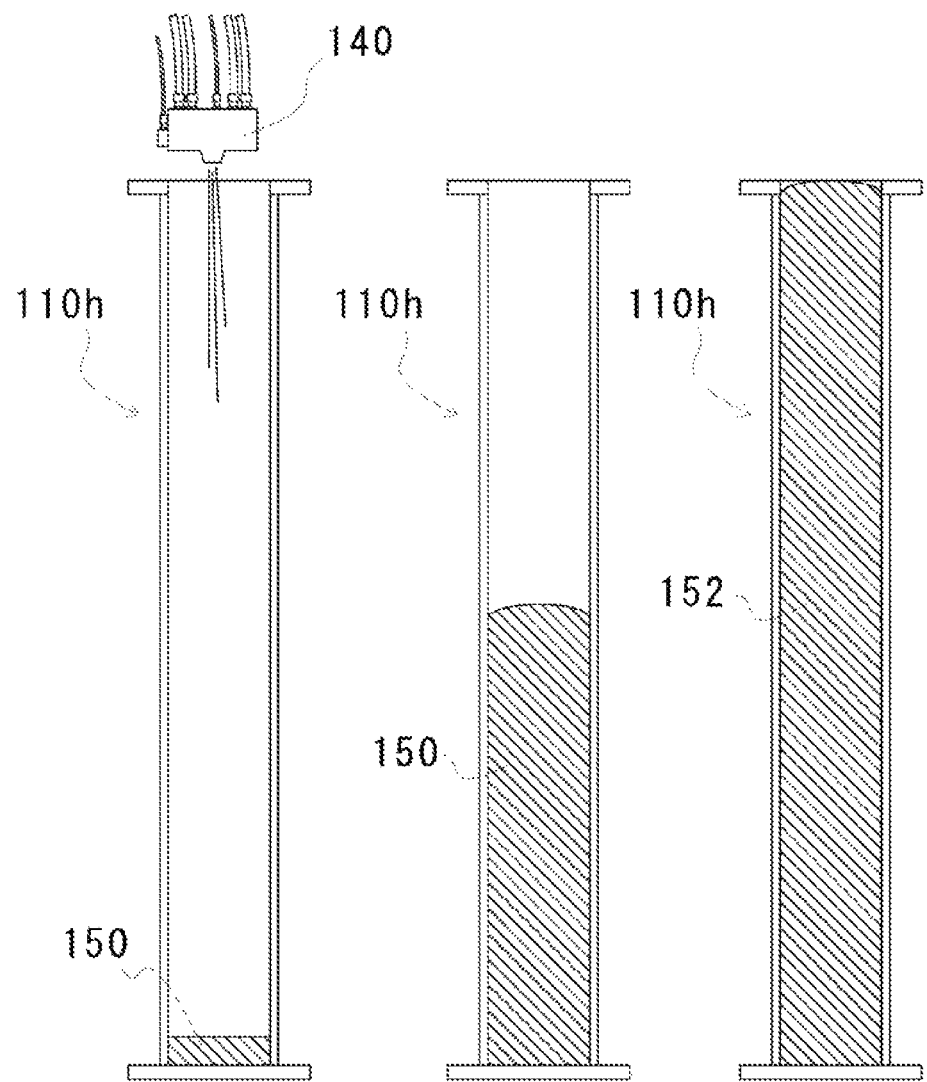
*FIG. 2A*  *FIG. 2B*  *FIG. 2C*

PREVENTING PROGRESSION OF CORROSION IN STEEL PIPE STRUCTURE

CROSS-REFERENCE TO RELATED APPLICATION

This application is a continuation of International Application No. PCT/JP2015/050007, filed on Jan. 5, 2015, which is based on and claims the benefit of priority from Japanese Patent Application No. 2014-004287, filed on Jan. 14, 2014, the entire contents of both applications are incorporated herein by reference.

FIELD

The present invention relates to methods for preventing progression of corrosion in a steel pipe structure.

BACKGROUND

Members constituting a transmission line tower can be roughly divided into angular steel members having an L-shaped cross-section and tubular steel pipes. Since steel pipes have a higher rigidity than angular steels, many steel pipes are used in a large transmission tower. Surfaces of steel members and surfaces of steel pipes are plated for corrosion protection treatment when a transmission tower is constructed. Therefore, high corrosion protection capability is achieved on the surfaces of steel members and steel pipes. In contrast, when many existing transmission towers were constructed, the technique for plating inner surfaces of steel pipes had not yet been established. Therefore, in existing transmission towers that are mainly constituted by steel pipes, plating on the inner surfaces of their steel pipes is uneven in many cases. For this reason, in those existing transmission towers constituted by steel pipe members, corrosion on the inner surfaces of the steel pipes (rusting on the inner surfaces) tends to readily occur due to the influence of the natural environment over time.

Once corrosion (rusting) occurs, this corrosion (rusting) progresses rapidly. Therefore, if corrosion on an inner surface of a steel pipe is found, the corrosion needs to be dealt with immediately. Conceivable methods for completely removing corrosion include partial replacement of a corroded steel pipe, and overall reconstruction of the transmission tower itself. However, partial replacement of a steel pipe requires production of a jig for temporarily supporting a load and assembly of scaffolding, resulting in large-scale, long-term work, high costs, and long-term suspension of power transmission.

Overall reconstruction of a transmission tower itself requires not only removal of the existing transmission tower and construction of a new transmission tower, but also construction of a temporary transmission tower for supporting power transmission lines after removing the existing transmission tower until the construction of the new transmission tower is finished. Therefore, much more costs are required and a longer term of work is taken than in the partial replacement work for a steel pipe. Thus, the partial replacement of a steel pipe and the overall reconstruction of a transmission tower itself pose many problems.

As a method for preventing progression of corrosion in a transmission tower without requiring the partial replacement of a steel pipe and the overall reconstruction of the transmission tower itself, a method of filling the inside of a transmission tower (steel pipe) with synthetic resin has been disclosed (e.g., Patent Document 1). In Patent Document 1, an internal space of a transmission tower steel pipe is filled from the bottom to the top with synthetic resin by inserting an extruder into the internal space of the transmission tower steel pipe that constitutes an existing hollow steel pipe transmission tower, and gradually pulling up the extruder while extruding the synthetic resin (styrofoam) from the extruder.

Related Documents

Patent Document 1: Japanese Patent No. 4832072

SUMMARY OF THE INVENTION

It is stated in Patent Document 1 that corrosion in a steel pipe transmission tower can be repaired at a low cost. However, with the configuration in Patent Document 1, a nozzle of the extruder needs to be inserted from the upper end to the region of the lower end of a steel pipe. In the case of this configuration, long cable and introduction pipe that correspond to the length of the steel pipe are required, and a cable support tool has to be arranged on the ground and other members of the steel pipe transmission tower whose corrosion is to be repaired. Therefore, large-scale apparatuses and operations are required. In addition, with the method in which synthetic resin is simply injected as in Patent Document 1, the same amount of synthetic resin as the internal volume of the transmission tower steel pipe has to be injected. A transmission line tower is configured by connecting a plurality of steel pipes in the height direction, and the heights of the steel pipes vary from about 45 meters in the case of a short steel pipe, up to 100 meters or longer in the case of a high steel pipe. Therefore, the higher the transmission tower is, the longer the injection time and the operating time are, resulting in a decrease in operational efficiency.

Furthermore, the size of an extruder in which a motor, a screw, a heater, and a CCD camera are mounted, such as the extruder in Patent Document 1, is always large. As mentioned above, a transmission tower is configured by connecting a plurality of steel pipes. Regarding the diameters of the steel pipes, a steel pipe arranged in a lower part has a large diameter, whereas, the upper the arrangement position is, the smaller the diameter is. For this reason, it is extremely difficult to insert a large extruder in a steel pipe arranged in the uppermost part of the transmission tower, i.e., the top of the transmission tower as in Patent Document 1, and it is considered that the method in Patent Document 1 cannot be carried out in reality.

In view of the foregoing problem, an object of the present invention is to provide a method for preventing progression of corrosion in a steel pipe structure, the method being able to efficiently prevent progression of corrosion on an inner surface of a steel pipe, with a simple operation.

To solve the foregoing problem, a feature of a representative configuration of a method for preventing progression of corrosion in a steel pipe structure according to the present invention lies in injecting two or more types of liquids, while mixing the two or more types of liquids, into a steel pipe that constitutes the steel pipe structure, from an opening at one of both ends of the steel pipe; and filling an inside of the steel pipe with resin foam product by foam expansion and hardening of the two types of liquids.

With the above configuration, two or more types of liquids are injected, while being mixed, into the steel pipe. As a result of the mixed liquids expanding while foaming, the steel pipe is filled with resin foam product (hereinafter referred to as "foam product"). For this reason, an operation of gradually pulling up an extruder inserted in a steel pipe while extruding synthetic resin and filling the steel pipe with the synthetic resin using the extruder is not necessary. This simplicity of the operation can improve operational efficiency. In addition, a nozzle of an extruder does not need to be inserted down to the region of the lower end of a steel pipe. Therefore, long cable and introduction pipe that correspond to the length of the steel pipe are not necessary. Accordingly, the size of an apparatus to be used can be reduced, and this method is suitable for operation at a height. As a result of the inside of the steel pipe being filled with the foam product, a corroded portion enters a state of being covered with the foam product. Thus, the corroded portion can be prevented from coming into contact with oxygen and moisture, and accordingly, progression of the corrosion is prevented. The method for preventing progression of corrosion according to the present invention is effective in prevention of corrosion in newly-constructed steel pipe structures, and is also effective for existing structures in which corrosion has already occurred, because progression of the corrosion can be prevented.

In addition, since the two or more types of liquids foam and expand by being mixed, the amount of the liquids to be injected into the steel pipe can be set to a much smaller amount than the volume of the inside of the steel pipe. Note that the two or more types of liquids may be agents that foam and expand due to a chemical reaction, or may be a combination with which a foaming agent is directly added to cause foaming Accordingly, the time required for a liquid injecting operation can be significantly shortened, and a further improvement in the operational efficiency is achieved. Furthermore, the two or more types of liquids are injected, while being mixed, into the steel pipe from the opening thereof, without inserting an apparatus such as an extruder into the steel pipe. Therefore, the present invention can be carried out with apparatuses of any size, which leads to high versatility.

To achieve the foregoing problem, a feature of another configuration of the method for preventing progression of corrosion in a steel pipe structure according to the present invention lies in forming an injection hole on a side surface of a steel pipe that constitutes the steel pipe structure; injecting two or more types of liquids, while mixing the two or more types of liquids, into the steel pipe from the injection hole; and filling an inside of the steel pipe with resin foam product by foam expansion and hardening of the two types of liquids. With this configuration as well, effects similar to the effects of the above-described method for preventing progression of corrosion can be achieved. In addition, the mixed liquids can be injected from the injection hole formed on the side surface of the steel pipe. Accordingly, it is also possible to form the injection hole in the region of a corroded portion and treat only the region of this corroded portion.

It is preferable that the injection hold is formed in the region of a lower end of the steel pipe. Thus, attachment of the mixed liquids to an inner surface of the steel pipe is suppressed. Accordingly, the liquids can be more preferably foamed and expanded, and the density of the foam product with which the steel pipe is filled can be made uniform.

It is preferable that a tube is attached to an end of a nozzle for mixing the two or more types of liquids, and the mixed two or more types of liquids are injected into the steel pipe from the tube. With this configuration, the liquids can also be inserted into a small-diameter steel pipe, e.g., a tilting pipe that is joined, like a diagonal brace, to a main column member and on which a flange is provided at an end portion in some cases. Accordingly, a small-diameter steel pipe can also be treated. By employing a disposable tube, the tube can be removed from the nozzle and buried as it is after the mixed liquids are injected.

It is preferable that the two or more types of liquids are injected under high pressure while being mixed under high pressure using the nozzle. By thus mixing the two or more types of liquids under high pressure, the liquids can be uniformly mixed, and the quality stability of the foam product generated by these liquids can be improved. In addition, by injecting the liquids under high pressure, the mixed liquids can be quickly conveyed from the upper part of the steel pipe to the lower side. Accordingly, the liquid injection can be completed before the liquids begin to foam and expand.

It is preferable that an end portion of the steel pipe is further sealed after the inside of the steel pipe is filled with the resin foam product. Thus, the steel pipe can be prevented from being exposed to water from an end portion thereof, and progression of corrosion can be further prevented. Note that a urethane material and a silicon material can be preferably used respectively as the resin foam product and the sealing material. However, the resin foam product and the sealing material are not limited thereto, and any other materials can also be used as appropriate.

It is preferable that the two or more types of liquids are excessively injected into the steel pipe such that a volume of the resin foam product after the foaming and expansion is larger than a volume of the steel pipe, the opening of the steel pipe is sealed after the injection, and the resin foam product in the region of the opening of the steel pipe is brought into a compacted state by foam expansion and hardening of the two types of liquids in a state where the opening of the steel pipe is sealed.

With this configuration, dimensional stability of the resin foam product can be improved. Note that, when the opening of the steel pipe is sealed, the inside of the steel pipe does not need to be completely sealed, and a state is also possible where a vent hole or the like for letting a gas generated when the two or more types of liquids foam and expand to go outside of the steel pipe is provided.

According to the present invention, it is possible to provide a method for preventing progression of corrosion in a steel pipe structure, the method being able to efficiently prevent progression of corrosion on an inner surface of a steel pipe with a simple operation.

BRIEF EXPLANATION OF THE DRAWINGS

FIGS. 2A, 2B and 2C are diagrams illustrating a method for preventing progression of corrosion according to a first embodiment.

DETAILED DESCRIPTION

Figure 1:
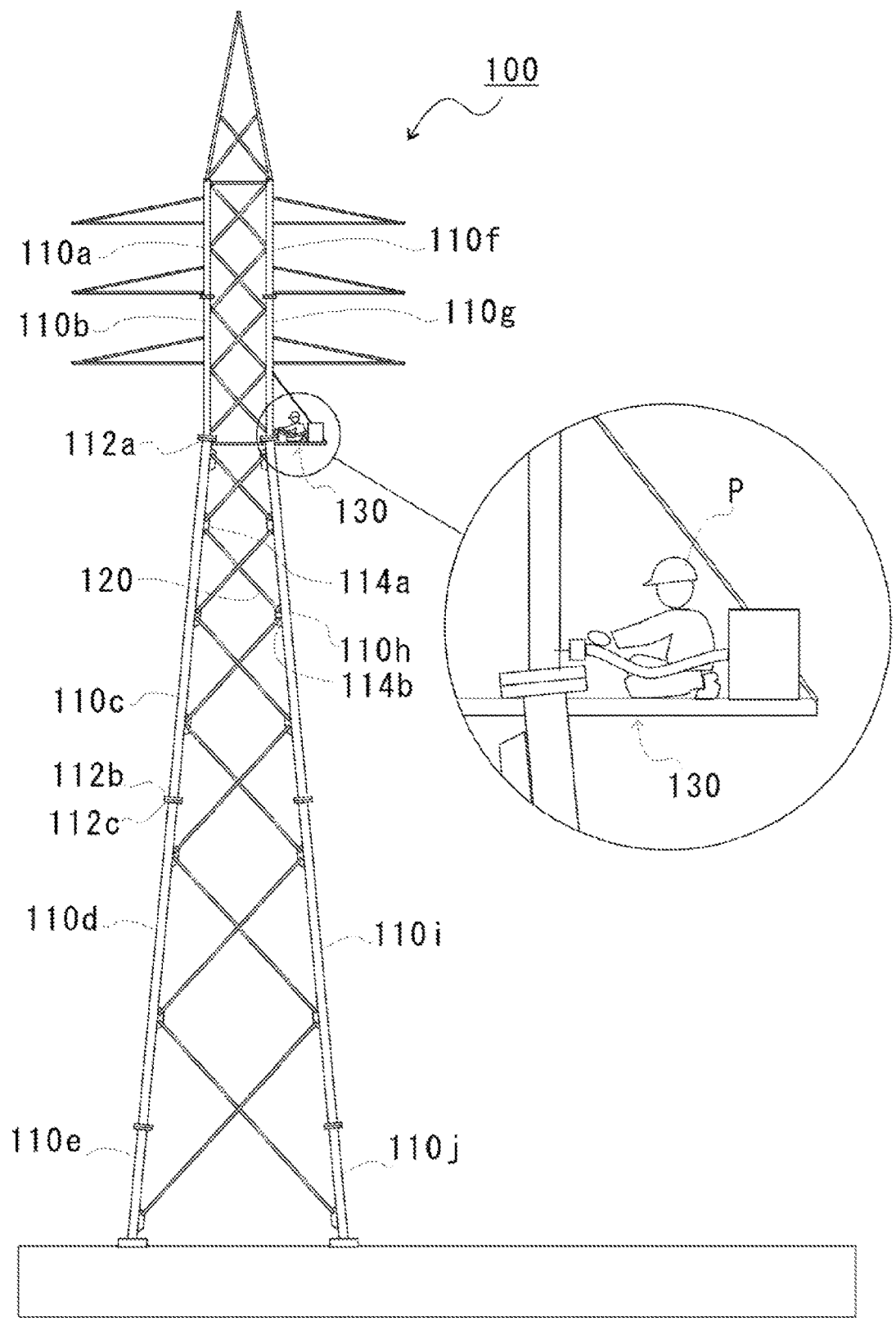
FIG. 1 is a diagram showing an exemplary transmission tower to which a method for preventing progression of corrosion in a steel pipe structure according to present embodiments is applied.

Preferable embodiments of the present invention will be hereinafter described in detail with reference to the attached drawings. The dimensions, materials, and any other specific values or the like described in the embodiments are merely examples for facilitating understanding of the invention, and do not limit the present invention unless otherwise stated. Note that in the present specification and drawings, elements having substantially the same functions and configurations will be assigned the same signs to omit redundant descriptions, and elements that are not directly related to the present invention will be omitted in the drawings.

FIG. 1 is a diagram showing an exemplary transmission tower 100 to which a method for preventing progression of corrosion in a steel pipe structure according to the present embodiments is applied. As shown in FIG. 1, the transmission tower 100 is configured by connecting a plurality of steel pipes 110a to 110j. The steel pipes 110a to 110j are tubular, and flanges are formed at end portions of these steel pipes. Flanges 112a and 112b on the steel pipe 110c are examples of those flanges. By fixing a flange 112c at an upper end of the steel pipe 110d arranged on the lower side and the flange 112b at a lower end of the steel pipe 110c connected to an upper part of the steel pipe 110d to each other, these steel pipes 110c and 110d are connected.

Gusset plates (gusset plates 114a and 114b are shown as examples in FIG. 1) are provided on the steel pipes, and the steel pipes 110c and 110h are connected by a diagonal member 120 being connected to these gusset plates 114a and 114b. Furthermore, scaffolding 130 is provided on the transmission tower 100, and an operator P performs operation on this scaffolding 130.

First Embodiment

FIGS. 2A, 2B and 2C are diagrams illustrating the method for preventing progression of corrosion according to a first embodiment, and showing a cross-section of the steel pipe 110h shown in FIG. 1. As shown in FIG. 2A, in the method for preventing progression of corrosion according to the first embodiment, two or more types of liquids are injected from an end (a later-described discharge port 140a) of a nozzle 140 while being mixed within the nozzle 140, into the steel pipe 110h from an opening at one of both ends of the steel pipe 110h (an opening in an upper part is shown as an example in FIG. 2A). Note that, although the present embodiment describes an exemplary case of mixing and injecting two types of liquids 150, the present invention is not limited thereto. Three or more types of liquids can also be mixed and injected.

Figure 3A:
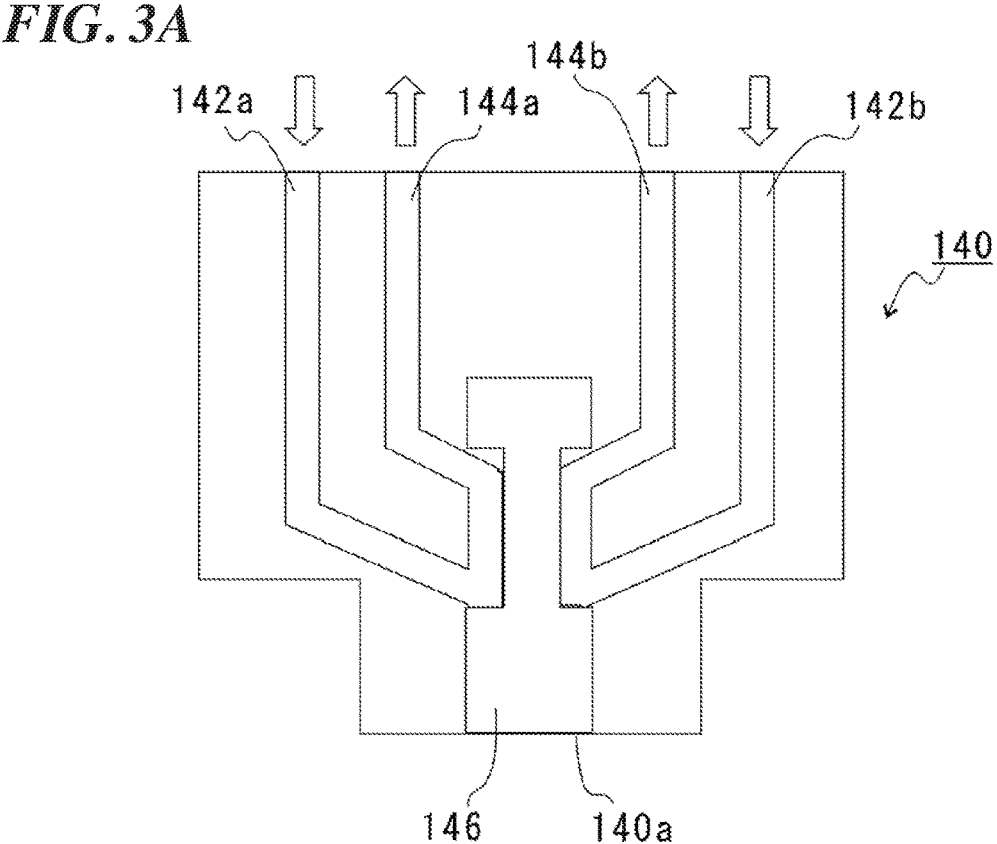
FIGS. 3A and 3B are diagrams illustrating details of a nozzle shown in FIGS. 2A, 2B and 2C.
Figure 3B:
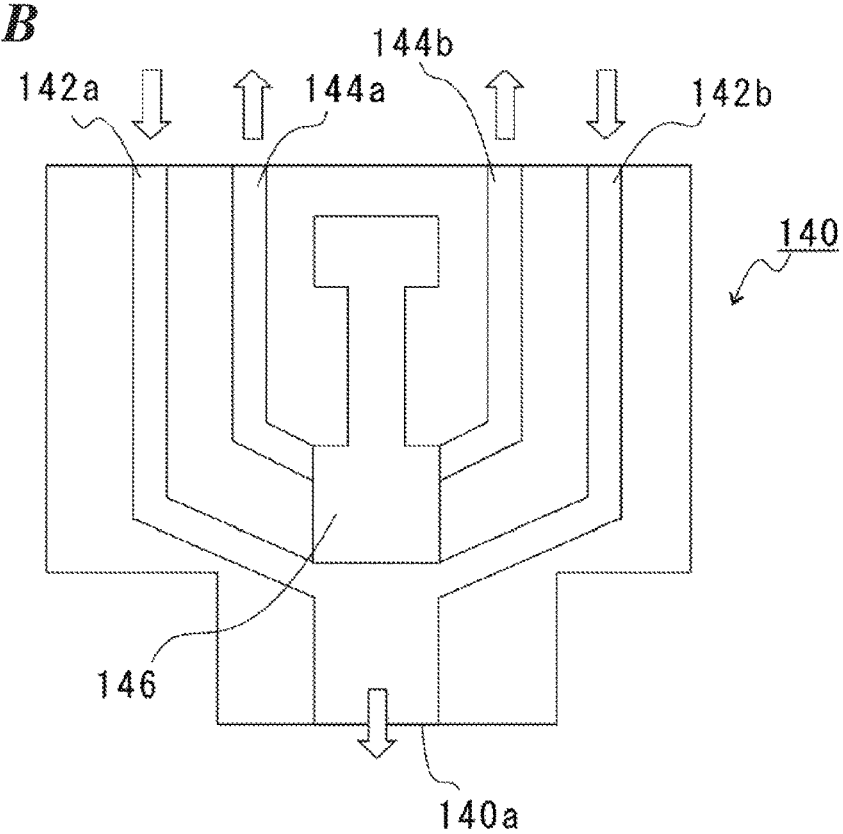

FIGS. 3A and 3B are diagrams illustrating details of the nozzle 140 shown in FIGS. 2A, 2B and 2C, and showing a cross-section of the nozzle. In present embodiment, the two types of liquids 150 are injected under high pressure while being mixed under high pressure using the nozzle 140 shown in FIG. 3A. As shown in FIG. 3A, a first supply pipe 142a for supplying one of the two types of liquids (hereinafter referred to as a liquid A) to the nozzle 140, and a second supply pipe 142b for supplying the other (hereinafter referred to as a liquid B) are connected to the nozzle 140. A first delivery pipe 144a and a second delivery pipe 144b for delivering, to a supply tank (not shown), the liquid A and the liquid B that are supplied to the nozzle 140 are also connected to the nozzle 140. Furthermore, a cock 146 for sealing the discharge port 140a is provided in the nozzle 140, and a hydraulic cable (not shown) that is connected to a compressor (not shown) and used for opening and closing this cock 146 is connected to the nozzle 140.

With the above configuration, the two types of liquids (the liquid A and the liquid B) flow so as to circulate through the supply tank and the nozzle 140. By opening the cock 146, the liquid A and the liquid B are mixed at the discharge port 140a, and are ejected from the discharge port 140a. At this time, as a result of a configuration in which the liquid A and the liquid B circulate through the supply tank and the nozzle 140 as in the present embodiment, a decrease in the pressure in the nozzle 140 when the cock 146 is opened can be prevented. Accordingly, the high-pressure state in the nozzle 140 is preferably maintained, and therefore, the liquid A and the liquid B can be injected under high pressure while being mixed under high pressure.

As a result of the liquid A and the liquid B being able to be mixed under high pressure as in the present embodiment, they can be uniformly mixed, and these liquids can be quickly conveyed. Accordingly, the injection of the liquids 150 can be completed before the foaming and expansion at the time of reaction begin.

Upon the liquids that have been mixed under high pressure in the nozzle 140 as described above being injected into the steel pipe 110h as shown in FIG. 2A, the reacted liquids foam and expand upward as shown in FIG. 2B. Then, the foamed and expanded liquids 150 harden and turn into a resin foam product (hereinafter referred to as foam product 152), and as a result, the inside of the steel pipe 110h is filled with this foam product 152 as shown in FIG. 2C.

With the above configuration, a corroded portion is covered with the foam product 152 in the steel pipe 110h. Accordingly, the corroded portion can be prevented from coming into contact with oxygen and moisture. Accordingly, progression of the corrosion is prevented, and the corroded portion can be preferably treated. The method for preventing progression of corrosion according to the present invention is effective in prevention of corrosion in newly-constructed steel pipe structures, and is also effective for existing structures in which corrosion has already occurred, because the method can prevent progression of corrosion. At this time, the mixed liquids 150 react and expand while foaming, and the steel pipe 110h is filled with the foam product 152. As a result, a conventionally performed operation of inserting an extruder into the steel pipe 110h, and gradually pulling up the extruder while extruding resin and filling the steel pipe 110h with the resin is not necessary. For this reason, the operation can be simplified, and an improvement in the operational efficiency can be achieved.

A nozzle of an extruder does not need to be inserted down to the region of the lower end of a steel pipe as in the conventional technique, and therefore, a long cable and an introduction tube that correspond to the length of the steel pipe 110h are not necessary. Accordingly, the size of the apparatus can be reduced, and an excellent operability can be achieved even in operation at a height. In addition, the two or more types of liquids 150 are injected, while being mixed, into the steel pipe 110h from the opening thereof, without inserting an apparatus such as an extruder into the steel pipe 110h. As a result, the method for preventing progression of corrosion according to the present embodiment can be applied to the cases of use of apparatuses of any size, and accordingly, high versatility can be achieved.

Furthermore, as a result of the mixed liquids 150 reacting to foam and expand as mentioned above, the amount of the liquids 150 to be injected into the steel pipe 110h can be set to a much smaller amount than the internal volume of the steel pipe 110h compared with the case of simply injecting liquid resin as in the conventional technique. For this reason, the time required for the operation of injecting the liquids 150, i.e., the operation of filling the steel pipe 110h can be significantly shortened, and the operational efficiency can be further improved.

Note that, regarding the resin foam product (the foam product 152), for example, polyol and isocyanate can be used as the two types of liquids, and foamed polyurethane resin generated by the reaction between polyol and isocyanate can be preferably used. However, the present invention is not limited thereto, and any other materials that are foam products which foam, expand, and harden when two or more types of liquids react, such as phenolic resin, can be used.

Furthermore, it is preferable to further seal the end portion of the steel pipe after the inside of the steel pipe is filled with the resin foam product. Thus, the steel pipe can be prevented from being exposed to water from the end portion thereof, and progression of corrosion can be further prevented. A urethane material and a silicon material can be taken respectively as examples of the resin foam product and the sealing material.

More preferably, the two or more types of liquids are excessively injected into a steel pipe such that the volume of the resin foam product after the foaming and expansion is larger than the internal volume of the steel pipe, the opening of the steel pipe is sealed after the injection, and the two types of liquids are foamed, expanded, and hardened in a state where the opening of the steel pipe is sealed, thereby bringing the resin foam product in the region of the opening of the steel pipe into a compacted state (over-packing). Thus, dimensional stability of the resin foam product can be improved.

Second Embodiment

Figures 4A, 4B, 4C:
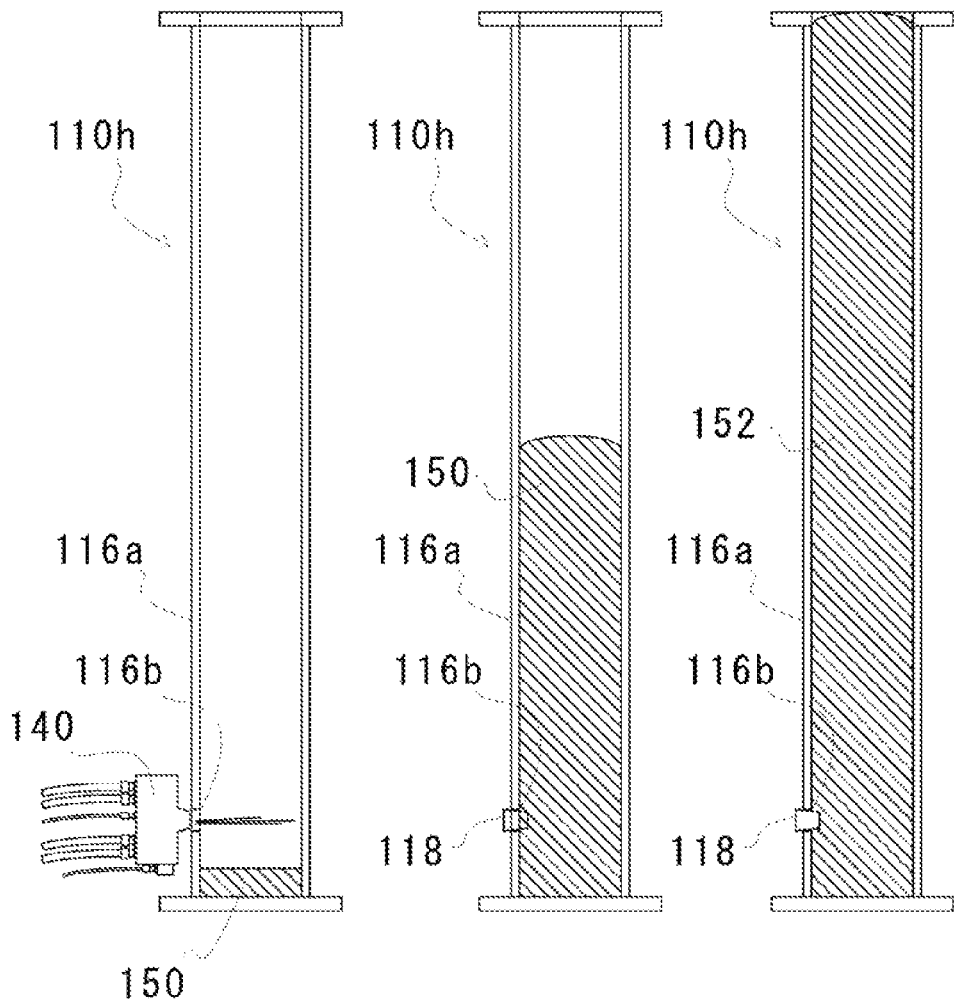
FIGS. 4A, 4B and 4C are diagrams illustrating a method for preventing progression of corrosion according to a second embodiment.

FIGS. 4A, 4B and 4C are diagram illustrating a method for preventing progression of corrosion according to a second embodiment, and show, similar to FIG. 2A, a cross-section of the steel pipe 110h shown in FIG. 1. Note that constituent elements that overlap those described in the first embodiment will be assigned the same signs, and their description will be omitted.

In the method for preventing progression of corrosion according to the second embodiment, as shown in FIG. 4A, an injection hole 116b is formed on a side surface 116a of the steel pipe 110h, and the two types of liquids 150 are injected, while being mixed, into the steel pipe 110h from the injection hole 116b. After the injection is completed, the injection hole 116b is sealed by a plug 118 as shown in FIG. 4B. Thus, as shown in FIG. 4B, the reacted liquids 150 foam and expand upward, and the foamed and expanded liquids 150 harden and become foam product 152. As a result, the inside of the steel pipe 110h is filled with the foam product 152 as shown in FIG. 4C.

As described above, with the method for preventing progression of corrosion according to the second embodiment as well, the mixed liquids 150 react to expand while foaming, and the steel pipe 110h is filled with the foam product 152. Accordingly, effects similar to the effects of the above-described method for preventing progression of corrosion according to the first embodiment can be achieved. With a configuration in which the liquids 150 are injected from the injection hole 116b on the side surface 116a of the steel pipe 110h, only the region of a corroded portion can be treated by forming the injection hold 116b in the region of the corroded portion. Accordingly, the amount of the foam product 152 to be used as well as the cost can be reduced.

It is preferable that the injection hole 116b formed on the side surface 116a of the steel pipe 110h is provided in the region of the lower end of the steel pipe 110h, as in the present embodiment. This is because the attachment of the mixed liquids 150 to an inner surface of the steel pipe 110h is thereby suppressed, and therefore, the liquids 150 can be more preferably foamed and expanded, and the density of the foam product 152 that fills the steel pipe 110h can be made uniform. However, the position of the injection hole 116b in the present embodiment is merely an example, and a configuration in which the injection hole 116b is formed in an upper part or an intermediate part of the steel pipe 110h is not excluded.

Third Embodiment

Figures 5A, 5B, 5C:
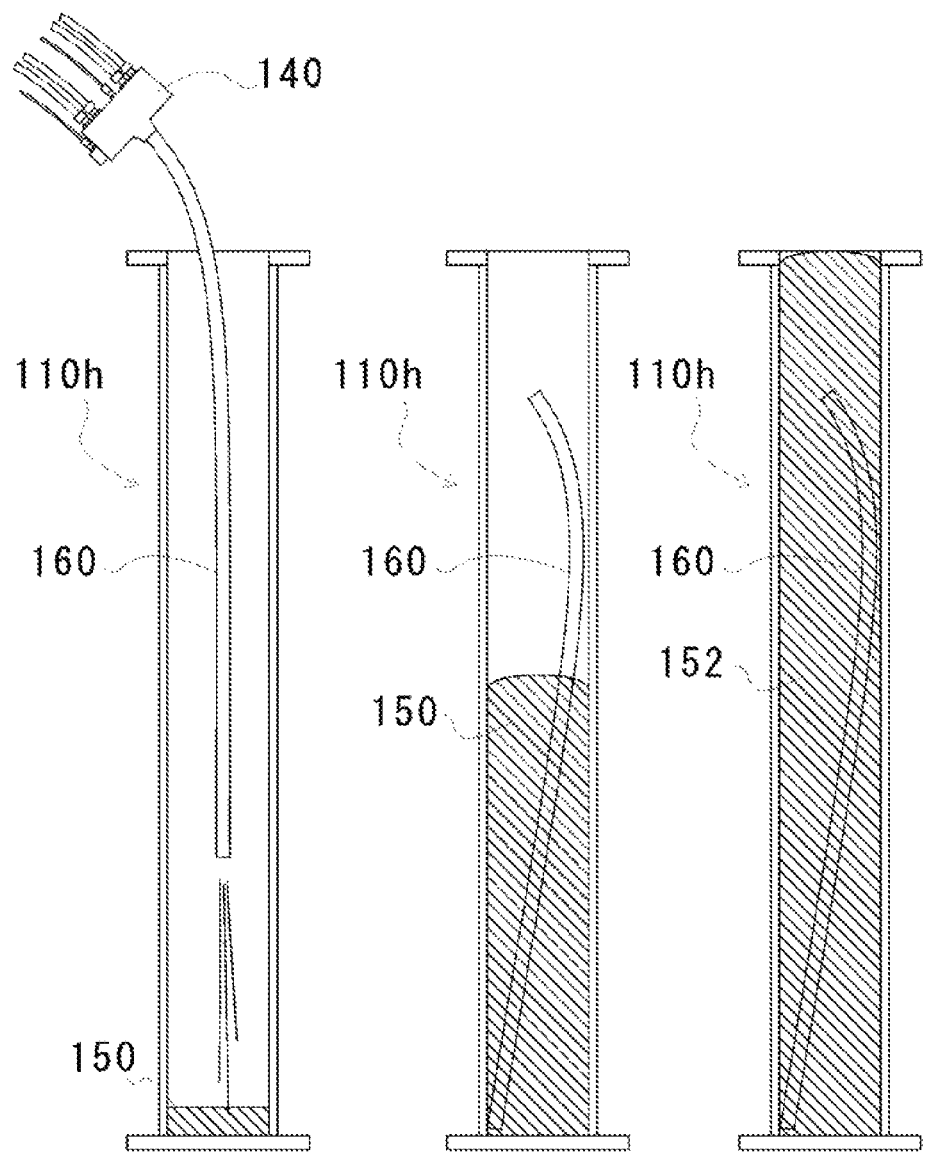
FIGS. 5A, 5B and 5C are diagrams illustrating a method for preventing progression of corrosion according to a third embodiment.

FIGS. 5A, 5B and 5C are diagrams illustrating a method for preventing progression of corrosion according to a third embodiment, and show, similar to FIG. 2A, a cross-section of the steel pipe 110h shown in FIG. 1. Note that constituent elements that overlap those described in the first embodiment and the second embodiment will be assigned the same signs, and their description will be omitted.

In the method for preventing progression of corrosion according to the third embodiment, as shown in FIG. 5A, a tube 160 is attached to an end of the nozzle 140 for mixing the two types of liquids (the liquid A and the liquid B), and the liquids 150 that have been mixed in the nozzle 140 are injected into the steel pipe 110h from the tube 160. Thus, as shown in FIG. 5B, the reacted liquids 150 foam and expand upward, and the foamed and expanded liquids 150 harden and turn into foam product 152. As a result, the inside of the steel pipe 110h is filled with the foam product 152 as shown in FIG. 5C.

As described above, by injecting the liquids 150 using the tube 160 connected to the end of the nozzle 140, the attachment of the mixed liquids 150 to an inner surface of the steel pipe 110h can be suppressed, similar to the second embodiment. Accordingly, it is possible to preferably foam and expand the liquids 150 and make the foam product 152 that fills the steel pipe 110h uniform.

By employing a disposable tube, as shown in FIGS. 5B and 5C, the tube 160 can be removed from the nozzle 140 after the injection of the mixed liquids 150, and the tube 160 can be buried as it is. Of course, the tube 160 may also be pulled out after the injection of the mixed liquids 150.

Figure 6A:
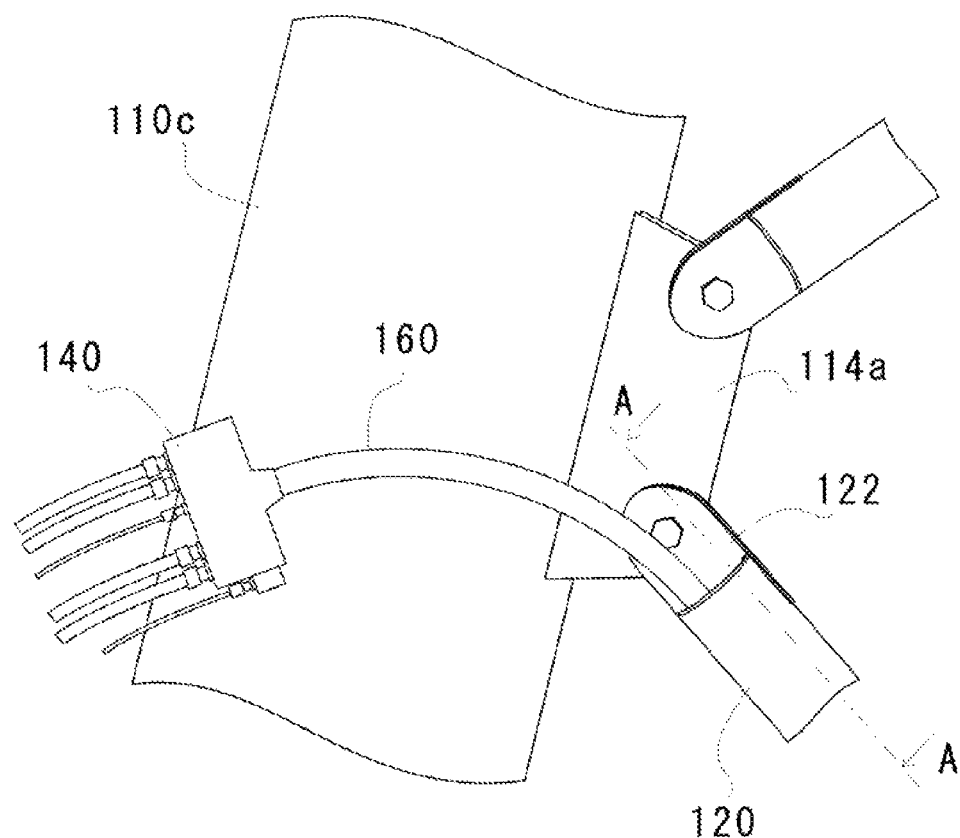
FIGS. 6A and 6B are diagrams illustrating treatment of a diagonal member shown in FIG. 1.
Figure 6B:
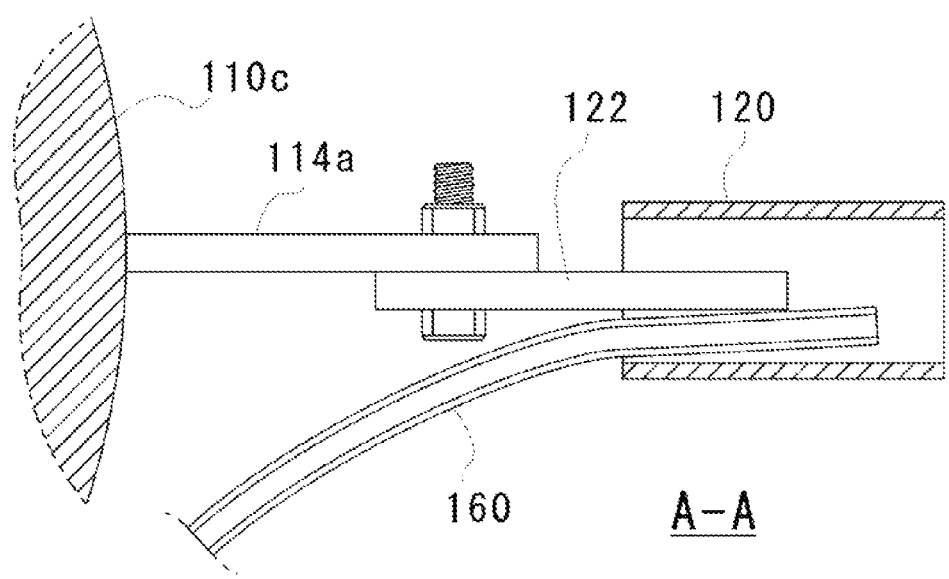

FIGS. 6A and 6B are diagrams illustrating treatment of a diagonal member 120 shown in FIG. 1. FIG. 6A is an enlarged view of the region of a connecting portion between the steel pipe 110c and the diagonal member 120 in FIG. 1, and FIG. 6B is a cross-sectional view of FIG. 6A taken along line A-A. As shown in FIGS. 6A and 6B, a flange 122 for attaching the diagonal member 120 to the gusset plate 114a on the steel pipe 110c is provided at an end portion of the diagonal member 120. For this reason, it is difficult to bring the end of the nozzle 140 close to the end portion of the diagonal member 120 and inject the liquids into the diagonal member 120. Here, if the end of the nozzle 140 is elongated, the liquids 150 can be injected into the diagonal member 120. However, in the case of mixing the two types of liquids in the nozzle 140 as in the present embodiment, if the end of the nozzle 140 is elongated, there is concern that the liquids 150 remaining at the end harden and the nozzle 140 is clogged.

In the present embodiment, as shown in FIGS. 6A and 6B, the tube 160 is connected to the end of the nozzle 140 as in the above-described third embodiment, and the tube 160 is inserted into the diagonal member 120. Thus, the liquids 150 can also be preferably injected in cases where the diameter is small, such as the diameter of the diagonal member 120 that is connected, like a diagonal brace, to a main column (the steel pipe 110c), or in the case where the flange 122 is provided at an end portion. Accordingly, the operation can be suitably performed.

Although preferable embodiments of the present invention have been described above with reference to the attached drawings, the present invention is needless to say not limited to the above-described examples. It is apparent that a person skilled in the art may conceive various variations and modifications within the scope of the appended patent claims, and those variations and modifications should be understood to be naturally encompassed in the technical scope of the present invention.

The present invention can be used as a method for preventing progression of corrosion in a steel pipe structure.

The invention claimed is:

1. A method for preventing progression of corrosion in a steel pipe structure, comprising:
   injecting two or more types of liquids, while mixing the two or more types of liquids, into a steel pipe that constitutes the steel pipe structure, from an opening at one of both ends of the steel pipe, wherein a tube is attached to an end of a nozzle for mixing the two or more types of liquids, and the mixed two or more types of liquids are injected into the steel pipe from the tube; and
   filling an inside of the steel pipe with resin foam product by foam expansion and hardening of the two types of liquids.

2. The method for preventing progression of corrosion in a steel pipe structure according to claim 1, wherein the two or more types of liquids are injected under high pressure while being mixed under high pressure using the nozzle.

3. The method for preventing progression of corrosion in a steel pipe structure according to claim 1, wherein an end portion of the steel pipe is sealed after the inside of the steel pipe is filled with the resin foam product.

4. The method for preventing progression of corrosion according in a steel pipe structure to claim 1, wherein:
   the two or more types of liquids are excessively injected into the steel pipe such that a volume of the resin foam product after the foam expansion is larger than a volume of the steel pipe;
   the opening of the steel pipe is sealed after the injection; and
   the resin foam product in the region of the opening of the steel pipe is brought into a compacted state by foam expansion and hardening of the two types of liquids in a state where the opening of the steel pipe is sealed.

5. A method for preventing progression of corrosion in a steel pipe structure, comprising:
   injecting two or more types of liquids, while mixing the two or more types of liquids, into a steel pipe that constitutes the steel pipe structure, from an opening at one of both ends of the steel pipe; and
   filling an inside of the steel pipe with resin foam product by foam expansion and hardening of the two types of liquids, wherein the two or more types of liquids are excessively injected into the steel pipe such that a volume of the resin foam product after the foam expansion is larger than a volume of the steel pipe;
   sealing the opening of the steel pipe after the injection; and
   bringing the resin foam product in the region of the opening of the steel pipe into a compacted state by foam expansion and hardening of the two types of liquids in a state where the opening of the steel pipe is sealed.

6. The method for preventing progression of corrosion in a steel pipe structure according to claim 5, wherein:
   a tube is attached to an end of a nozzle for mixing the two or more types of liquids; and
   the mixed two or more types of liquids are injected into the steel pipe from the tube.

7. The method for preventing progression of corrosion in a steel pipe structure according to claim 6, wherein the two or more types of liquids are injected under high pressure while being mixed under high pressure using the nozzle.

* * * * *